Nov. 26, 1968  E. R. GOMEZ  3,413,500

ELECTRICALLY-OPERATED BRAKE

Filed April 14, 1966  3 Sheets-Sheet 1

Nov. 26, 1968  E. R. GOMEZ  3,413,500
ELECTRICALLY-OPERATED BRAKE
Filed April 14, 1966   3 Sheets-Sheet 3

United States Patent Office 3,413,500
Patented Nov. 26, 1968

3,413,500
ELECTRICALLY-OPERATED BRAKE
Emilio R. Gomez, Madrid, Spain, assignor to Technical Aid Consultants Limited, London, England, a British company
Filed Apr. 14, 1966, Ser. No. 542,616
5 Claims. (Cl. 310—93)

ABSTRACT OF THE DISCLOSURE

A braking system for a drive shaft includes a tubular cylindrical stationary member through which the drive shaft axially extends and is journalled and two axially spaced sets of circumferentially spaced radially spaced stator defining fixed magnetic cores projecting radially from the cylindrical member and provided with windings for connection to an electric power source. A drum, open at its inner end and formed of a magnetic material, surrounds each of the core sets and is affixed to the drive shaft so that braking is effected by energizing the stator coils.

---

This invention relates to an electrically operated retarder brake system and is more specifically concerned with a special arrangement for coupling to the transmission shafts of automotive vehicles and, more especially, trucks of large tonnage, and heavy duty vehicles.

Electric brake mechanisms are known for use as braking systems on vehicles during prolonged downhill running and in emergencies. The effectiveness of the known systems is limited to a series of points on which the mechansm is connected to the feeding source so as to produce the proposed effect which is based on the electromagnetic retention force of a series of coils on a mobile flywheel linked to the transmission shaft which is to be controlled.

The present invention provides an electrically operated brake system for driven rotating shafts, more especially transmission shafts of motor vehicles which comprises (1) a stator comprising a hollow cylindrical support having mounted on its periphery a series of radially oriented pairs of electro-magnets and (2) a rotor connected to rotate with the shaft, which rotor comprises two drums mounted on an auxiliary shaft coaxial with the stator which drums are adapted together to surround the stator, the side walls of the drums facing and spaced from the cores of the stator electro-magnets, and made of magnetic material and (3) means for activating the electro-magnets to produce a controlled and variable current flow to the electro-magnets.

The coils of the electro-magnets are connected to the electric power supply source in such a way that successive connection of the different points of a control lever determines the desired degree of braking.

The coils of the electro-magnets are preferably coated with an insulating material which allows the reaching of high intensities in the coils without danger of perforation of the same, at the same time the coils are protected from the irradiation of heat from the rotor.

The drums comprising the rotor can either be made entirely of magnetic material or they can be provided with a rim of magnetic material disposed opposte to faces of the cores of the electro-magnets.

In a preferred embodiment of the invention the outer surface of the drums comprising the flywheel is finned on its outer surface which produces an efficient circulation of cooling air around the surface when the drums rotate.

Another characteristic of the invention is the possibility of arranging the hollow shaft in such a way that the currents generated among the different integral elements may circulate peripherally without producing a heating of the integral mass, for which reason the grease seals used in the lubrication of the assembly can be made of natural or synthetic rubbers, which is, of course, not possible in the electric brake mechanisms known up to now, where the heating produced by the derived currents makes necessary the exclusive use of metallic retainers.

In one embodiment of the invention an external control regulator is provided for setting the bearings, allowing perfect adjustment of the bearing and facilitating the periodical service to which the device requires. In this embodiment, the mobile hub is perforated on a taper, held by a rivet and exterior tightening nut and, on the neck, it carries a threaded perforated plate which is fixed in any of the positions of the angles of the circumference by means of screws which are inserted from the outside, and this plate has a small front ring facing which exerts pressure on one of the tracks of the one of the double thrust bearings, so that the approach of the elements and, therefore, the pitching in the rotating assembly, is controlled in one operation which requires little time and labour. The supports carrying the pairs of electro-magnets are provided with arms ending in brackets for the fixing on the frame of the vehicle through silent mounting blocks. The whole brake assembly is enclosed in a housing which prevents the penetration of foreign elements which, if they entered the brake system, could cause overheating and possibly fire, a risk, unfortunately too frequent in present brakes.

The embodiment of the central shaft with its two tapered ends and an axial pivot, ending in threaded studs, is another characteristic of the invention; the heads of the rotating system are introduced into these tapers.

The combined axial and radial thrust bearings are supported on the internal track and more precisely, on the central stem of the mobile shaft which can be connected to the driven shaft which is to be retarded.

In essence, the essential characteristic of this low idle speed consists in obtaining the maximum yield from the stress produced on the rotary flywheels by the magnetic field created by the arrangement of coils so that the braking couple may reach its maximum force.

The basic advantage of the brake provided by the present invention are as follows:

(1) The design of the brake is such that the operating temperature is kept low. This is further achieved by the provision of external fins on the drums of the rotor.

(2) The radial arrangement of the electro-magnets and the rotation of the rotor about an axis coaxial with the support for electro-magnets results in a constant spacing of the faces of the cores of the magnets from the inner magnetic surface of the drum and obviates the need for periodic adjustment of the spacing.

(3) The enclosed design of the brake minimises the danger of introduction of foreign particles into the brake.

(4) The relatively low operating temperature allows the use of conventional insulating and sealing materials.

A preferred embodiment of the invention is described in the accompanying drawings in which.

Figure 1:
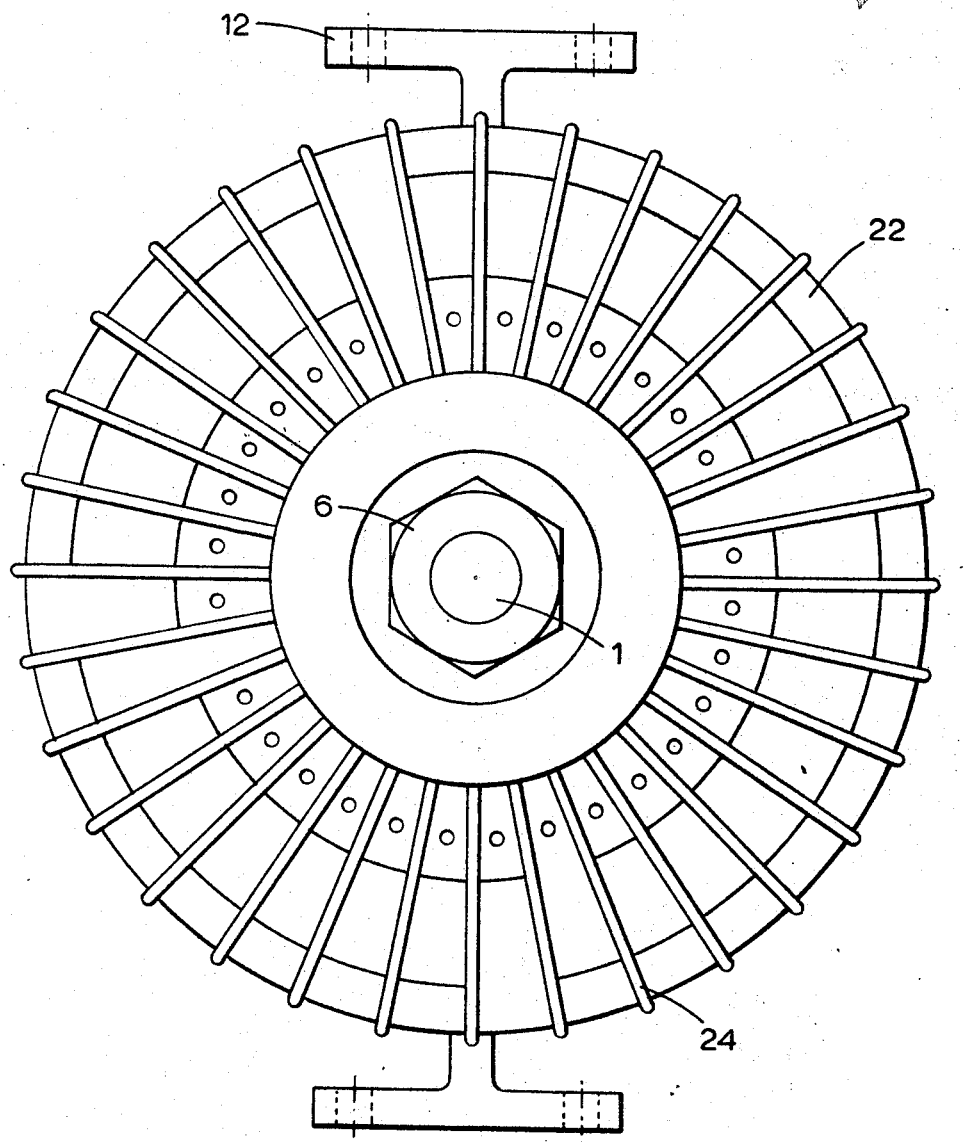
FIG. 1 illustrates an exterior view of the mechanism of the invention.

Referring now to the drawings main shaft 1 has at each end a conical zone 3 and nuts 6. On one end of the main shaft there is provided a pivot 4 for the reception of a second head 5 which is held in position by the nut 6. On the shaft 1 are arranged double thrust bearings 7 which support the rotor 22 on the internal part of support 8 for coils 9 and cores 21. The support 8 is also provided with the seals 10 which prevent the escape of the lubricant which is introduced into the central box through conduits 11 in supports 12 of the assembly is fixed to the frame of the vehicle or machine. Coils 9 are coated with insulation material 23. Surface 20 of the rotor is provided with an insert of magnetic material.

Figure 2:
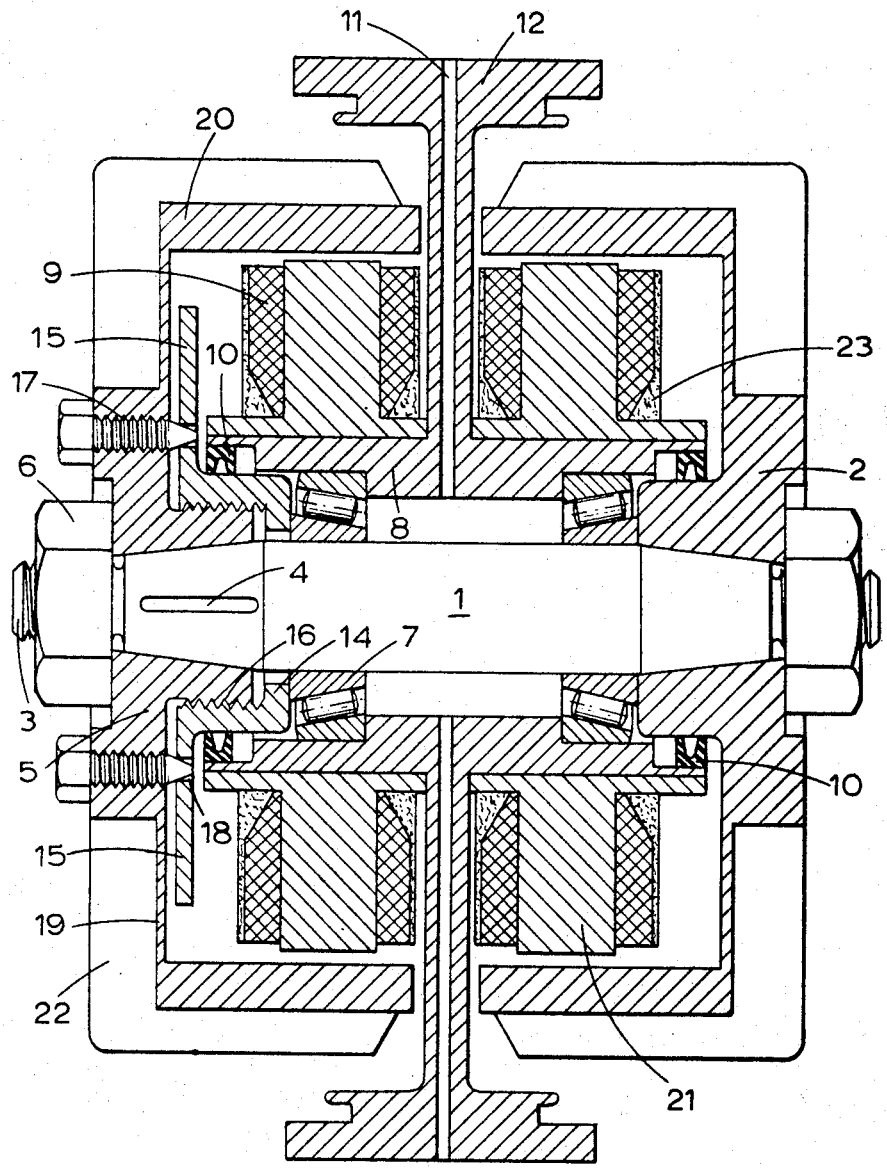
FIG. 2 is a cross-section of the assembly along a diametrical projection.

One of the bearings 7, that represented on the right in FIGURE 2, is supported on the shaft 1 against a collar on the shaft and the complementary bearings on the left-hand side of the same figure is supported against a collar 14 on plate 15 which is threaded and screwed on to neck 16 of the head 5 and is positioned by way of set screws 17, designed to retain the plate with selective introduction in any of the perforations 18 provided on the plate 15 and on the circumference. In such a way the mechanism by rotation at a certain angle provides a controlled approach of the collar 14 which exerts pressure on the track of the bearings, this approach being a function of the thread pitches of the neck 16.

The heads 2 and 5 carry flywheel 19 which, in turn, carry the drums comprising the rotor 20.

Figure 3:
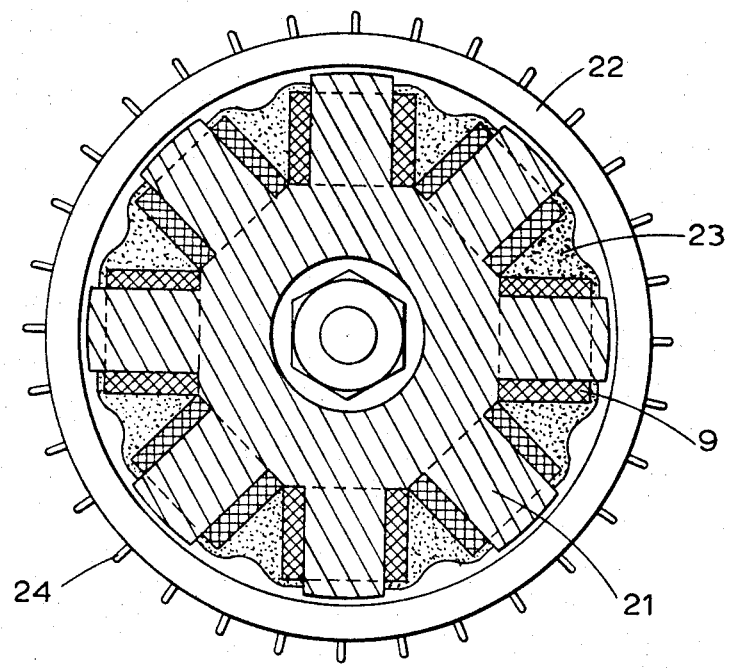
FIG. 3 shows a front view of the element.

The outer surface of the drums 22 is provided with fins 24 (see FIGS. 1 and 3) which increase the circulation of air around the drum when it rotates and so improves cooling efficiency.

What I claim is:

1. An electrically operated brake system for driven rotating shafts, more especially transmission shafts of motor vehicles, which comprises a stator comprising a hollow cylindrical support having mounted on its periphery a series of radially oriented pairs of electro-magnets adapted to be connected to a controlled source of power, and a rotor connected to rotate with the shaft, which rotor comprises two drums mounted on an auxiliary shaft coaxial with the stator which drums are adapted together to surround the stator, the side walls of the drums lying opposite to and spaced from the cores of the electro-magnets and being of magnetic material.

2. A brake as claimed in claim 1 wherein the drums forming the rotor are finned on their outer surfaces.

3. A brake as claimed in claim 1 wherein the internal surfaces of the cylindrical support of the stator is separated from the auxiliary shaft carrying the drums of the rotor by means of seals of rubber.

4. A brake as claimed in claim 1, wherein the rotor is adapted to rotate around the stator on double thrust bearings.

5. A brake as claimed in claim 1, wherein the stator carries fixing members for attachment to the chassis of the vehicle.

References Cited

UNITED STATES PATENTS

| | | | |
|---|---|---|---|
| 2,487,416 | 11/1949 | Bessiere | 310—93 |
| 2,516,903 | 8/1950 | Oetzel | 310—93 |
| 2,683,229 | 7/1954 | Bessiere | 310—93 |
| 2,733,361 | 1/1956 | Bessiere | 310—93 |

ROBERT K. SCHAEFER, *Primary Examiner.*

H. O. JONES, *Assistant Examiner.*